United States Patent
Sheriff et al.

(10) Patent No.: US 9,420,397 B1
(45) Date of Patent: Aug. 16, 2016

(54) CONFIGURING A MOBILE DEVICE TO SCAN FOR AVAILABLE WIRELESS ACCESS POINTS WHEN WIRELESS DATA COMMUNICATION IS DISABLED

(71) Applicant: Google Inc., Mountain View, CA (US)

(72) Inventors: Irfan Sheriff, Mountain View, CA (US); Angana Ghosh, Mountain View, CA (US)

(73) Assignee: Google Inc., Mountain View, CA (US)

( * ) Notice: Subject to any disclaimer, the term of this patent is extended or adjusted under 35 U.S.C. 154(b) by 237 days.

(21) Appl. No.: 13/904,157

(22) Filed: May 29, 2013

Related U.S. Application Data

(60) Provisional application No. 61/823,672, filed on May 15, 2013.

(51) Int. Cl.
*H04W 4/00* (2009.01)

(52) U.S. Cl.
CPC ..................................... *H04W 4/001* (2013.01)

(58) Field of Classification Search
USPC .......................................... 455/402, 403, 408
See application file for complete search history.

(56) References Cited

U.S. PATENT DOCUMENTS

2008/0293431 A1* 11/2008 Buerger et al. ............ 455/456.1
2013/0184003 A1*  7/2013 Alizadeh-Shabdiz
                                      et al. ......................... 455/456.1

OTHER PUBLICATIONS

Saveyourtech (http://www.solveyourtech.com/turn-off-all-cellular-data-on-iphone-5/).*
The Mac Observer (http://www.macobserver.com/tmo/article/how-to-manage-the-radios-in-your-ios-device, Dec. 15, 2012).*
AskDifferent (http://apple.stackexchange.com/questions/45509/why-does-iphone-maps-app-sometimes-ask-to-enable-wi-fi-for-accuracy-even-thou).*

* cited by examiner

*Primary Examiner* — William Nealon
(74) *Attorney, Agent, or Firm* — McDonnell Boehnen Hulbert & Berghoff LLP

(57) ABSTRACT

Mobile devices and associated systems and methods are described. According to one example, a mobile device may include a unique scan only mode in which a wireless communication component of the mobile device is prevented from connecting to wireless networks for data communication, but may still be used to scan for available wireless access points for location determination purposes. According to another example, a mobile device may select which of a plurality of location-determination components that the mobile device should use to determine a location of the mobile device based on whether the mobile device is configured in a unique scan only mode.

15 Claims, 9 Drawing Sheets

300

| Configuration Settings | | Scan for Wi-Fi access points to determine location? |
|---|---|---|
| Wi-Fi On/Off | Wi-Fi Scan Only | |
| ON | ENABLED/ DISABLED | YES |
| OFF | ENABLED | YES — 306 |
| OFF | DISABLED | NO |

| Configuration Settings | | How often to scan for Wi-Fi access points? |
|---|---|---|
| Wi-Fi On/Off | Wi-Fi Scan Only | |
| ON | ENABLED/ DISABLED | Periodically or on-demand |
| OFF | ENABLED | Only in response to location request — 406 |
| OFF | DISABLED | Never |

Computer Program Product 1000

Signal Bearing Medium 1001

Program Instructions 1002

- receiving a request to determine a location of a mobile device;

- responsive to receiving the request, determining whether a configuration setting for a wireless communication component of the mobile device is enabled, wherein when the configuration setting is enabled the mobile device is permitted to use the wireless communication component to scan for wireless access points within a wireless range of the mobile device to facilitate location determination even when the mobile device is prohibited from using the wireless communication component to facilitate wireless data communication;

- based on the determination regarding whether the configuration setting is enabled, selecting one or more of a plurality of location-determination components to use to determine the location of the mobile device, wherein the plurality of location-determination components comprise a global positioning system (GPS), the wireless communication component, and a cellular radio communication component; and

- determining, by the processor, the location of the mobile device using the one or more selected location-determination components.

| Computer Readable Medium 1003 | Computer Recordable Medium 1004 | Communications Medium 1005 |

FIGURE 10

CONFIGURING A MOBILE DEVICE TO SCAN FOR AVAILABLE WIRELESS ACCESS POINTS WHEN WIRELESS DATA COMMUNICATION IS DISABLED

CROSS-REFERENCE TO RELATED APPLICATIONS

This application claims the benefit of U.S. Provisional Application No. 61/823,672 filed on May 15, 2013, the entirety of which is herein incorporated by reference.

BACKGROUND

An increase in the number of mobile devices, such as smartphones, tablets, and wearable computing devices, over the past few years has led to the emergence and development of many mobile location-based services. A few of the most common mobile location-based services include mapping, navigation, and searching for nearby restaurants or stores. Other examples include geo-tagging pictures, sharing current locations with friends, "checking-in" to places on social networks, and receiving location-based deals and promotions.

Given the growing number of mobile devices and the popularity of mobile location-based services, it is therefore not surprising that some mobile devices include multiple different types of positioning systems for determining a geographic location of the mobile device. For example, many mobile devices have an integrated global positioning system (GPS) that is configured to determine the position of a mobile device by precisely timing signals sent by GPS satellites above the Earth. In addition, some mobile devices are also configured to determine the position of the mobile device by measuring power levels and antenna patterns of cellular radio signals broadcast by cellular base stations. Some mobile devices also make use of the presence of one or more particular wireless access points to estimate the position of the mobile device based on triangulation and/or fingerprinting. Each of the different positioning systems has advantages and disadvantages.

SUMMARY

Many mobile device users disable a wireless communication component of the mobile device, such as a Wi-Fi component, to conserve battery life. However, allowing applications on the mobile device to determine a location of the mobile device by scanning for available wireless access points may improve location accuracy in some situations, such as indoor environments. Additionally, using the wireless communication component to determine a location of the mobile device may consume less power than using a GPS to determine a location of the mobile device, and may provide a location estimate faster than when determining a location of the mobile device using GPS.

While traditionally a wireless communication component of a mobile device is either enabled or disabled, described herein is an example mobile device that is configurable such that the wireless communication component of the mobile device may be used to scan for available wireless access points to facilitate location determination even when the mobile device is prevented from connecting to nearby wireless networks. According to one example, a mobile device may include a unique scan only mode in which the wireless communication component is prevented from connecting to wireless networks (e.g., to conserve battery life) but may still be used to scan for available wireless access points for location determination purposes. According to another example, a mobile device may select which of a plurality of location-determination components that the mobile device should use to determine a location of the mobile device based on whether the mobile device is configured in the scan only mode.

In one example aspect, a mobile device that includes a processor and a computer-readable medium is provided. The computer-readable medium may be configured to store instructions, that when executed by the processor, cause the mobile device to perform functions. The functions include receiving data indicating a selection for a first configuration setting of a wireless component of the mobile device. When the first configuration setting is enabled, the mobile device is permitted to use the wireless communication component to connect to one or more available wireless networks to facilitate wireless data communication. The functions also include receiving data indicating a selection for a second configuration setting of the wireless communication component. When the second configuration setting is enabled, the mobile device is permitted to use the wireless communication component to scan for available wireless access points within a wireless range of the mobile device to facilitate location determination. Additionally, the functions include determining, based on the first configuration setting and the second configuration setting, whether an application of the mobile device is permitted to use the wireless communication component to determine a location of the mobile device.

In another example aspect, a method is provided that involves receiving, by a mobile device, data indicating a request to determine a location of the mobile device. The method also includes responsive to receiving the data indicating the request, determining, by the mobile device, whether a configuration setting for a wireless communication component of the mobile device is enabled. When the configuration setting is enabled, the mobile device is permitted to use the wireless communication component to scan for available wireless access points within a wireless range of the mobile device to facilitate location determination even when the mobile device is prohibited from using the wireless communication component to facilitate wireless data communication. Additionally, the method includes based on the determination regarding whether the configuration setting is enabled, selecting, by the mobile device, one or more of a plurality of location-determination components to use to determine the location of the mobile device. The plurality of location-determination components comprises a global positioning system (GPS), the wireless communication component, and a cellular radio communication component. The method further includes determining, by the mobile device, the location of the mobile device using the one or more selected location-determination components.

In still another example aspect, a computer-readable medium having stored thereon instructions that, when executed by a mobile device, cause the mobile device to perform functions is provided. The functions include receiving data indicating a request to determine a location of the mobile device. The functions also include responsive to receiving the data indicating the request, determining whether a configuration setting for a wireless communication component of the mobile device is enabled. When the configuration setting is enabled, the mobile device is permitted to use the wireless communication component to scan for available wireless access points within a wireless range of the mobile device to facilitate location determination even when the mobile device is prohibited from using the wireless communication component to facilitate wireless data communication. Additionally, the functions include based on the determination regarding whether the configuration setting is enabled, selecting, one or more of a plurality of location-determination components to use to determine the location of the mobile device. The plurality of location-determination components includes a global positioning system (GPS), the wireless communication component, and a cellular radio communication component. The functions further include determining the location of the mobile device using the one or more selected location-determination components.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 3 is an example state table for determining whether to use a wireless communication component to determine a location.

FIG. 4 is an example state table for determining how often to scan for available wireless access points.

FIG. 10 is a schematic illustrating a conceptual partial view of an example computer program product that includes a computer program for executing a computer process on a computing device, arranged according to at least some embodiments presented herein.

DETAILED DESCRIPTION

Figure 1:
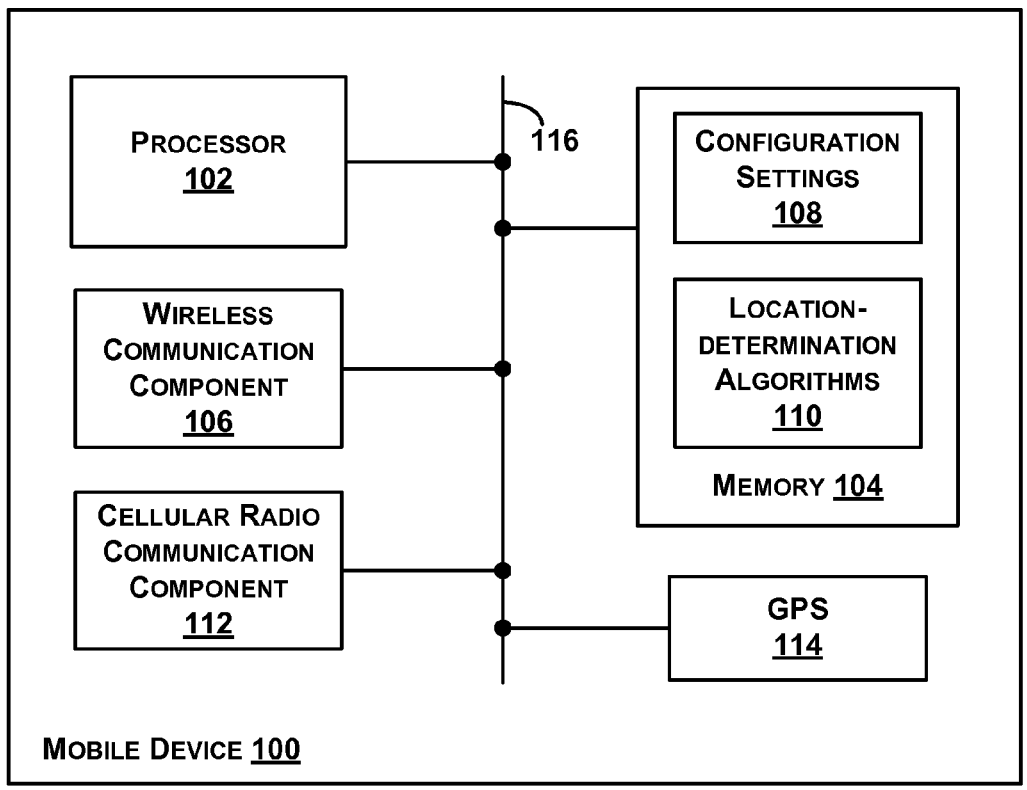
FIG. 1 illustrates an example mobile device.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Although portions of this disclosure are described with respect to a wireless communication component that is a Wi-Fi component, the examples are not meant to be limiting. The wireless communication component, as described herein, may be any type of communication interface that is configured to facilitate wireless data communication for a mobile device according to any existing or yet to be developed wireless communication standards.

This disclosure may disclose, inter alia, a mobile device that is configurable such that a wireless communication component of the mobile may be used to scan for available wireless access points to facilitate location determination even when the mobile device is prevented from connecting to nearby wireless networks. According to one example, a mobile device may include two separate configuration settings for a wireless communication component of the mobile device, each of which can be enabled independently. When a first configuration setting is enabled, the mobile device may be permitted to use the wireless communication component to facilitate wireless data communication. When a second configuration setting is enabled, the mobile device may be permitted to use the wireless communication component to scan for available wireless access points to facilitate location determination, even when the mobile device is prohibited from connecting to nearby wireless networks to facilitate wireless data communication.

In some instances, allowing the mobile device to use the wireless communication component to scan for wireless access points within a wireless range of the mobile device to facilitate location determination while prohibiting the mobile device from using the wireless communication to connect to nearby wireless networks to facilitate wireless data communication may provide the mobile device with more accurate location determination abilities while conserving power. For example, if the first configuration setting is disabled and the second configuration setting is enabled, the mobile device may be prohibited from attempting to authenticate and associate with a wireless access point for purposes of wireless data communication. Attempting to authenticate and associate with a wireless access point to connect to a wireless network consumes power, but the mobile device does not need to authenticate and associate with the wireless access points for purposes of location determination.

Therefore, in some examples, by prohibiting the mobile device to use the wireless communication component to facilitate wireless data communication but still allowing the mobile device to use the wireless communication component to scan for available wireless access points to facilitate location determination, the mobile device may receive the benefits of increased location quality and accuracy associated with using the wireless data communication to determine a location of the mobile device and reduced the amount of power consumed by the wireless communication component when attempting to authenticate and associate with a wireless access point for purposes of wireless data communication.

Additionally, described herein are example methods that may be executed by a mobile device or a component of a mobile device to determine which of a plurality of location-determination components that mobile device should use to determine a location of the mobile device. In one instance, the mobile device may select one or more location-determination components to use to determine a location of the mobile device based on whether the mobile device is configured to use the wireless communication component to facilitate location determination even when the mobile device is prohibited from using the wireless communication component to facilitate wireless data communication.

Additional functionalities and examples of the devices and methods are also described hereinafter with reference to the accompanying figures.

Referring now to the figures, FIG. 1 illustrates an example mobile device 100. The mobile device 100 may represent any type of mobile, wireless device that is configured to scan for nearby wireless access points and connect to a wired network by wirelessly communicating with a wireless access point. By way of example, the mobile device 100 may be a mobile phone having a Wi-Fi component that is configured to search for and connect to nearby Wi-Fi access points to facilitate wireless data communication. However, the example is not meant to be limiting. In other instances, the mobile device 100 may be a laptop computer, tablet, wearable computing device, or other type of computing device.

As shown in FIG. 1, the mobile device may include a processor 102, a memory 104, and a wireless communication component 106. The processor 102 may be any type of processor, such as a microprocessor, digital signal processor, multicore processor, etc., coupled to the memory 104. The memory 104 may be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

The wireless communication component 106 may be a communication interface that is configured to facilitate wireless data communication for the mobile device 100 according to one or more wireless communication standards. For example, the wireless communication component 106 may be a Wi-Fi communication component that is configured to facilitate wireless data communication according to one or more IEEE 802.11 standards. As another example, the wireless communication component 106 may be a Bluetooth communication component that is configured to facilitate wireless data communication according to one or more Bluetooth standards. Other examples are also possible.

Additionally, the memory 104 may be configured to store one or more configuration settings 108 and one or more location-determination algorithms 110. The configuration settings 108 may be configuration settings for the wireless communication component 106 that specify how the mobile device 100, as well as applications and other components of the mobile device 100, may use the wireless communication component 106. For example, the configuration settings 108 may specify whether the mobile device 100 is permitted to use the wireless communication component 106 to scan for wireless access points within a wireless range of the mobile device to facilitate location determination, or facilitate other purposes, even when the mobile device 100 is prohibited from using the wireless communication component 106 for wireless data communication purposes. As another example, the configuration settings 108 may specify whether the mobile device 100 is permitted to use the wireless communication component 106 to facilitate wireless data communication by connecting to one or more wireless networks.

In other examples, the configuration settings 108 may also include additional configuration settings that are unrelated to the wireless communication component 106. For example, a configuration setting may specify whether the mobile device 100 is permitted to determine a location of the mobile device 100 using one or more location-determination components and the location-determination algorithms 110.

The location-determination algorithms 110 may be executable by the processor 102 to determine one or more geographical location estimates of the mobile device 100. For example, the location-determination algorithms 110 may cause the processor 100 to use one or more location-determination components, such as the wireless communication component 106, a cellular radio communication component 112, or a GPS 114, to determine one or more geographic location estimates. In some instances, the location-determination algorithms 110 may be executable by the processor 102 to determine a geographic location estimate based on data received from one or more of the location-determination components.

For instance, the processor 100 may use a location-determination algorithm to determine a location of the mobile device 100 based on the presence and/or location of one or more known wireless access points within a wireless range of the mobile device 100. In one example, the wireless location component 106 may determine the identity of one or more wireless access points (e.g., a MAC address) and measure the intensity of signals received (e.g. received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access point, a location estimate of the mobile device 100 may be determined.

In another example, the wireless location component 106 may be configured to determine a wireless fingerprint based on a pattern of signals received from one or more wireless access points. The fingerprint may then be compared to one or more known calibration points for which a geographic location is known. Various deterministic algorithms, such as nearest neighbor in signal space (NNSS), k-nearest neighbor (KNN), and weighted k-nearest neighbor (WKNN), may be used to determine a closest calibration point to the fingerprint. Probabilistic methods may also be used to determine a most likely location based on a relationship between the fingerprint and known calibration points.

In another instance, the processor 102 may use a location-determination algorithm to determine a location of the mobile device 100 based on nearby cellular base stations. For example, the cellular radio communication component 112 may be configured to at least identify the cell from which the mobile device 100 is receiving, or last received, signal from a cellular network. The cellular radio communication component 112 may also be configured to measure a round trip time (RTT) to a base station providing the signal, and combine this information with the identified cell to determine a location estimate. In another example, the cellular communication component 112 may be configured to use observed time difference of arrival (OTDOA) from three or more base stations to estimate the location of the mobile device 100.

In still another instance, the processor 102 may use a location-determination algorithm to determine a location of the mobile device based on signals sent by GPS satellites above the Earth. For example, the GPS 114 may be configured to estimate a location of the mobile device by precisely timing signals sent by the GPS satellites.

In some examples, the processor 102 may use a location-determination algorithm that combines location estimates determined by multiple location-determination components, such as a combination of the wireless communication component 106, cellular radio component 112, and GPS 114.

As shown in FIG. 1, each of the processor 102, memory 104, wireless communication component 106, cellular radio component 112, and GPS 114 may be coupled together by one or more system buses, networks, or other connection mechanisms 116.

In some implementations, the mobile device 100 may include a device platform (not shown), which may be configured as a multi-layered Linux platform. The device platform may include different applications and an application framework, as well as various kernels, libraries, and runtime entities. In other examples, other formats or systems may operate the mobile device 100 as well.

In some examples, the mobile device 100 may be configured to receive data indicating selections for the configuration settings 108 based on input provided by a user. An example interface that a user may use to modify the configuration settings of a mobile device is described with reference to FIG. 2.

Figure 2:
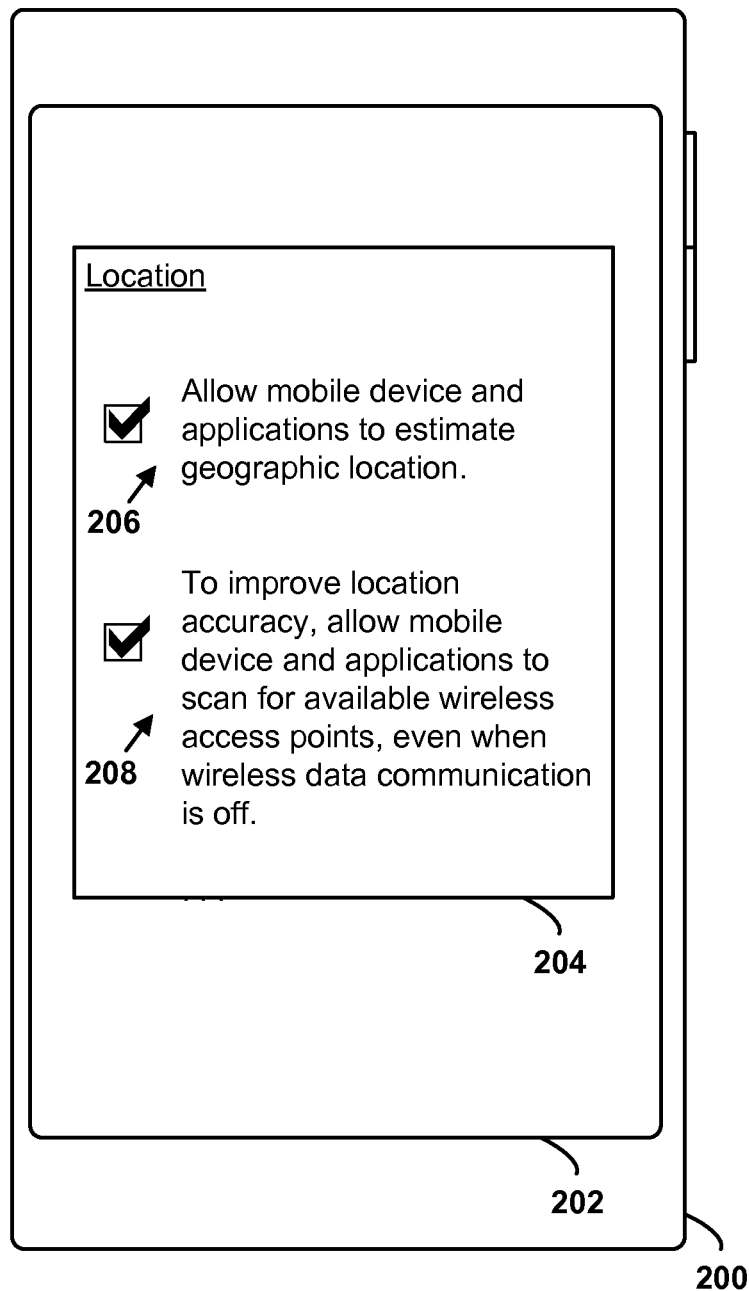
FIG. 2 is a conceptual illustration of an example interface of a mobile device.

FIG. 2 is a conceptual illustration of an example interface of a mobile device 200. The mobile device 200 may be similar to the mobile device 100 of FIG. 1. In one instance, a user may utilize the interface of the mobile device 200 to provide selections for one or more configuration settings. As shown in FIG. 2, the mobile device 200 may include a display 202. The display may be any type of display such as an active-matrix organic light-emitting diode (AMOLED) display, thin-film-transistor liquid-crystal-display (TFT LCD), or other type of display. Additionally, the display 202 may be a touchscreen, such as a capacitive touchscreen or other type of touchscreen.

In one example, a menu 204 may be provided on the display 202 by the mobile device 200. The menu 204 may enable a user to select configuration settings for the mobile device 200. For example, the menu 204 may include a first configuration setting 206 that may allow a user to enable the mobile device 200 and applications of the mobile device 200 to estimate a geographic location of the mobile device 200. The menu 204 may also include a second configuration setting 208 that may enable the mobile device 200 and applications of the mobile device to scan for available wireless access points, even when wireless data communication is off.

In one example, when the second configuration setting 208 is enabled, the mobile device 200 and applications of the mobile device 200 may be allowed to use a wireless communication component to scan for available wireless access points when the mobile device 200 is prohibited from using the wireless communication component to facilitate wireless data communication. For instance, if a user of the mobile device 200 disables wireless data communication on the mobile device 200, when the second configuration setting 208 is enabled, the mobile device may be permitted to scan for wireless access points within a wireless range of the mobile device 200 without connecting to a wireless network using the wireless access points.

In one embodiment, when the second configuration setting 208 is enabled and the mobile device 200 is prohibited from using a Wi-Fi module for wireless data communication, the Wi-Fi module of the mobile device 200 may transmit a probe request, seeking to identify any wireless access points within a wireless range of the mobile device. In response to receiving the probe request, a wireless access point may respond with information identifying the wireless access point. If the mobile device was allowed to use the Wi-Fi module for wireless data communication, the Wi-Fi module would normally then attempt to authenticate and associate with an identified wireless access point. However, since the Wi-Fi module is disabled for purposes of wireless data communication, the Wi-Fi module may not send any authentication requests and association requests to the wireless access point.

The mobile device 200 may also be configured to determine, based on one or configuration settings, whether an application of the mobile device is permitted to use the wireless communication component to determine a location of the mobile device. FIG. 3 is an example state table 300 for determining whether to use a wireless communication component to determine a location. In particular, FIG. 3 conceptually illustrates when an application of a mobile device, having a Wi-Fi component, may be permitted to scan for Wi-Fi access points to determine location. As shown in FIG. 3, the mobile device may determine whether the Wi-Fi component may scan for Wi-Fi access points to determine location based on two configuration settings. The first configuration setting, shown in column 302 and labeled as "Wi-Fi On/Off", specifies whether the mobile device is permitted to use the Wi-Fi component to connect to one or more wireless networks to facilitate wireless data communication. The second configuration setting, shown in column 304 and labeled as "Wi-Fi Scan Only", specifies whether the mobile device is permitted to use the Wi-Fi component to scan for available Wi-Fi access points within a wireless range of the mobile device to facilitate location determination.

According to the state table 300, if the mobile device is permitted to use the Wi-Fi component to facilitate wireless data communication (i.e., Wi-Fi ON), regardless of whether the Wi-Fi Scan Only configuration setting is enabled or disabled, the mobile device and applications of the mobile device are permitted to scan for Wi-Fi access points to determine location. As shown in row 306, if the mobile device is prohibited from using the Wi-Fi component to facilitate wireless data communication (i.e., Wi-Fi OFF) and the Wi-Fi Scan Only configuration setting is enabled, the mobile device and applications of the mobile device are permitted to scan for Wi-Fi access points to determine location. However, if the mobile device is prohibited from using the Wi-Fi component to facilitate wireless data communication and the Wi-Fi Scan Only configuration setting is disabled, the mobile device and applications of the mobile device are prohibited from scanning for Wi-Fi access points.

In some configurations, the Wi-Fi component of a mobile device may only be permitted to scan for Wi-Fi access points in response to receiving a location request. For instance, FIG. 4 conceptually illustrates such a configuration. In particular, FIG. 4 is one example state table for determining how often to scan for available wireless access points. As shown in FIG. 4, a mobile device may determine how often to scan for Wi-Fi access points to determine location based on two configuration settings. The two configuration settings are the same configuration settings as presented in FIG. 3 above, "Wi-Fi On/Off" shown in column 402 and "Wi-Fi Scan Only" shown in column 404.

According to the state table 400, if the mobile device is permitted to use the Wi-Fi component to facilitate wireless data communication (i.e., Wi-Fi ON), regardless of whether the Wi-Fi Scan Only configuration setting is enabled or disabled, the mobile device and applications of the mobile device may be permitted to scan for Wi-Fi access points periodically (e.g., every 20 seconds) or on-demand in response to any request from applications of the mobile device (e.g., in response to a request from an application that is triggered by a change in a power state of the mobile device, triggered by a date/time, etc.). As shown in row 406, if the mobile device is prohibited from using the Wi-Fi component to facilitate wireless data communication (i.e., Wi-Fi OFF) and the Wi-Fi Scan Only configuration setting is enabled, the mobile device and applications of the mobile device are only permitted to scan for Wi-Fi access points to determine location in response to receiving a location request. Such a request may be received from an application of the mobile device, for instance. However, if the mobile device is prohibited from using the Wi-Fi component to facilitate wireless data communication and the Wi-Fi Scan Only configuration setting is disabled, the mobile device and applications of the mobile device are always prohibited from scanning for Wi-Fi access points.

Figure 5:
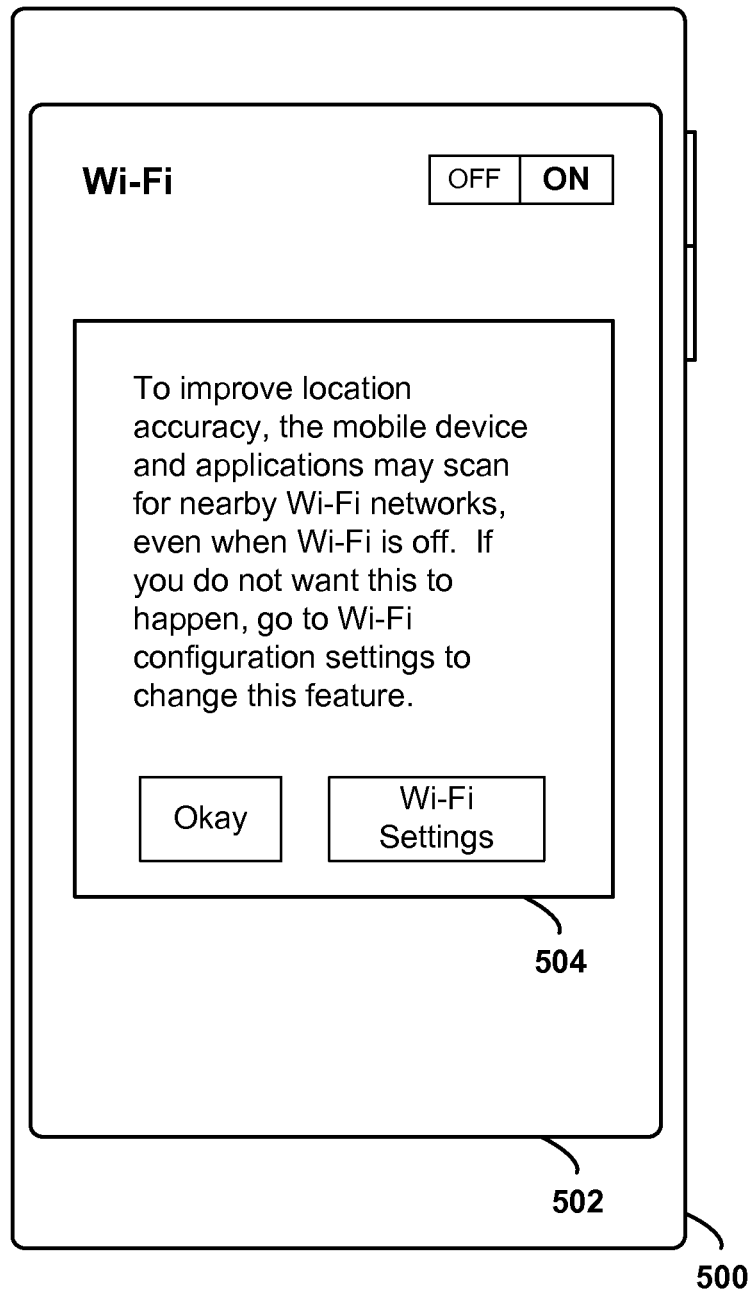
FIGS. 5 and 6 are conceptual illustrations of example features of a mobile device.
Figure 6:
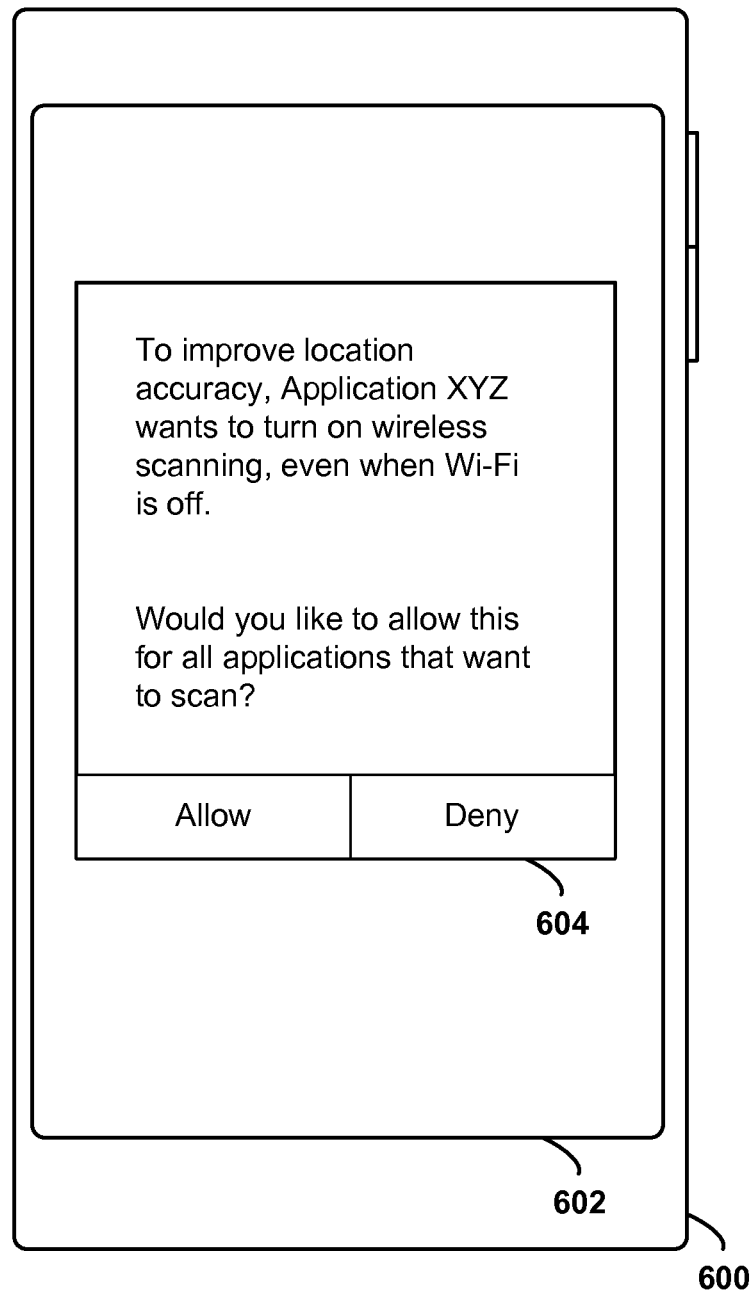

FIGS. 5 and 6 are conceptual illustrations of example features of a mobile device. As shown in FIG. 5, when a configuration setting that enables a Wi-Fi component of a mobile device 500 to scan for wireless access points to facilitate location determination, such as the "Wi-Fi Scan Only" configuration setting of FIGS. 3 and 4, is enabled and the mobile device receives data indicating a request to turn off the Wi-Fi component for purposes of wireless data communication, a display 502 of the mobile device 500 may provide a notification 504. In one example, the notification 504 may be provided when the mobile device 500 receives data indicating that a user of the mobile device has disabled the Wi-Fi component for purposes of wireless data communication by switching the Wi-Fi component from "ON" to "OFF". The notification 504 may indicate that the Wi-Fi component is permitted to scan for nearby Wi-Fi access points to facilitate location determination (or to facilitate other purposes). Thus, the notification 504 may be a reminder to the user that the "Wi-Fi Scan Only" configuration setting is enabled.

As shown in FIG. 6, when a user has not opted-in to allow a mobile device 600 to use a Wi-Fi component to scan for available wireless access points even when the Wi-Fi component is disabled for purposes of wireless data communication, the mobile device may request permission from a user to enable the "Wi-Fi Scan Only" configuration setting. For example, in response to (i) receiving a request from an application of the mobile device 600 to determine a location of the mobile device 600 and (ii) determining that the Wi-Fi component is disabled for purposes of wireless data communication and the "Wi-Fi Scan Only" configuration setting is disabled, a display 602 of the mobile device 600 may provide a notification 604. The notification 604 may indicate that the "Wi-Fi Scan Only" configuration setting be enabled to improve location accuracy. Thus, the notification 604 may be a suggestion that prompts the user to enable the "Wi-Fi Scan Only" configuration setting to improve location accuracy if the user has not previously enabled the "Wi-Fi Scan Only" configuration setting.

Figure 7:
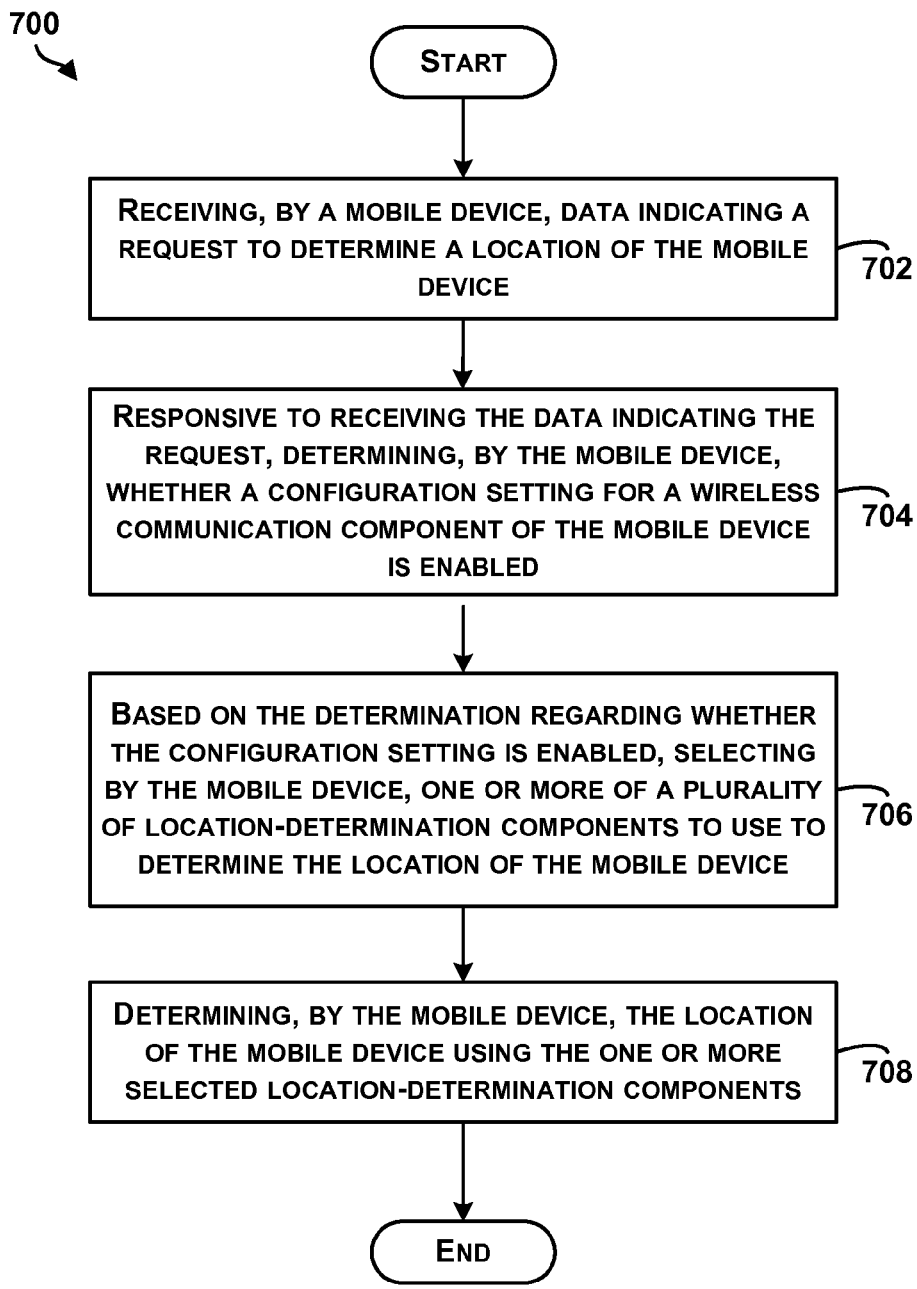
FIG. 7 is a block diagram of an example method for determining a location of a mobile device.

FIG. 7 is a block diagram of an example method 700 for determining a location of a mobile device. Method 700 shown in FIG. 7 presents an embodiment of a method that could be used or implemented by the mobile device 100 of FIG. 1, for example, or by components of the mobile device 100 of FIG. 1, or more generally by any computing device. Method 700 may include one or more operations, functions, or actions as illustrated by one or more of blocks 702-708. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, for the method 700 and other processes and methods disclosed herein, each block in FIG. 7 may represent circuitry that is wired to perform the specific logical functions in the process.

In one example, the method 700 may be performed by a mobile device when the mobile device is not permitted to use a wireless communication component to facilitate wireless data communication. However, the method 700 may also be performed in other situations.

Initially, at block 702, the method 700 includes receiving, by a mobile device, data indicating a request to determine a location of the mobile device. For example, the mobile device may receive, from an application of the mobile device, a request for an estimate of the geographic location of the mobile device to facilitate one or more location-based services.

At block 704, the method 700 includes responsive to receiving the data indicating the request, determining, by the mobile device, whether a configuration setting for a wireless communication component of the mobile device is enabled. In one example, the mobile device may determine whether the configuration setting is enabled by reading a configuration file or a configuration parameter that is stored in a database. When the configuration setting is enabled, the mobile device may be permitted to use the wireless communication component to scan for available wireless access points within a wireless range of the mobile device to facilitate location determination even when the mobile device is prohibited from using the wireless communication component to facilitate wireless data communication. For example, when the configuration setting is enabled and the mobile device is prohibited from using the wireless communication component to connect to one or more available wireless networks to facilitate wireless data communication, the mobile device may be permitted to use the wireless communication component to scan for the available wireless access points.

At block 706, the method 700 includes based on the determination regarding whether the configuration setting is enabled, selecting, by the mobile device, one or more of a plurality of location-determination components to use to determine the location of the mobile device. In one example, the plurality of location-determination components may include the wireless communication component, a cellular radio communication component, such as the cellular radio communication component 112 of FIG. 1, and a GPS. In other examples, the plurality of location-determination components may include additional location-determination components, and the example is not meant to be limiting.

Figure 8:
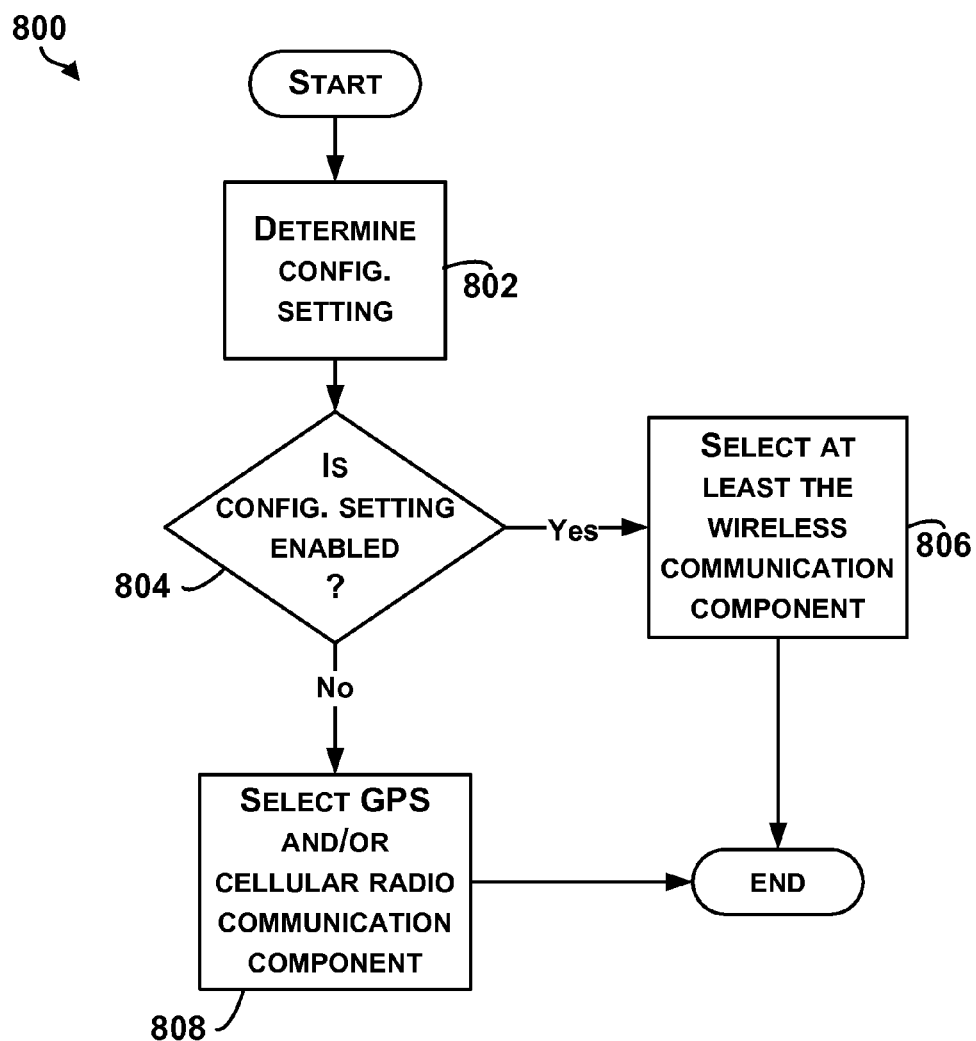
FIG. 8 is a flow chart of an example method for selecting one or more location-determination components.

Turning briefly to FIG. 8, FIG. 8 is a flow chart of an example method 800 for selecting one or more location-determination components. As shown in FIG. 8, initially, at block 802, the mobile device may determine whether the configuration setting is enabled. The decision block 804, illustrates how the example method 800 proceeds based on whether the configuration setting is enabled. If it is determined, at block 804, that the configuration setting is enabled, the mobile device may select to at least use the wireless communication component to determine the location of the mobile device at block 806. In addition, the mobile device may also select to use the GPS and/or cellular radio communication component in combination with the wireless communication component to determine a location of the mobile device.

If, however, it is determined at block 804 that the configuration setting is disabled, the mobile device may select to use the GPS and/or cellular radio communication component to determine the location of the mobile device at block 808. In such a scenario, the mobile device may be prohibited from using the wireless communication component to determine a location of the mobile device.

The example method 800 is one example of a method that the mobile device may use to perform the selection described at block 706 based on the configuration setting. However, other selection methods may also be used.

Referring back to FIG. 7, at block 708, the method 700 includes determining, by the mobile device, the location of the mobile device using the one or more selected location-determination components. As described above with reference to FIG. 1, the mobile device may cause one or more processors of the mobile device to execute one or more location-determination algorithms to determine an estimate of the geographic location of the mobile device. For instance, the one or more processors may receive data from the one or more selected location-determination components and determine a location based on the received data. The determined location may then be provided to the application of the mobile device that requested the location.

Figure 9:
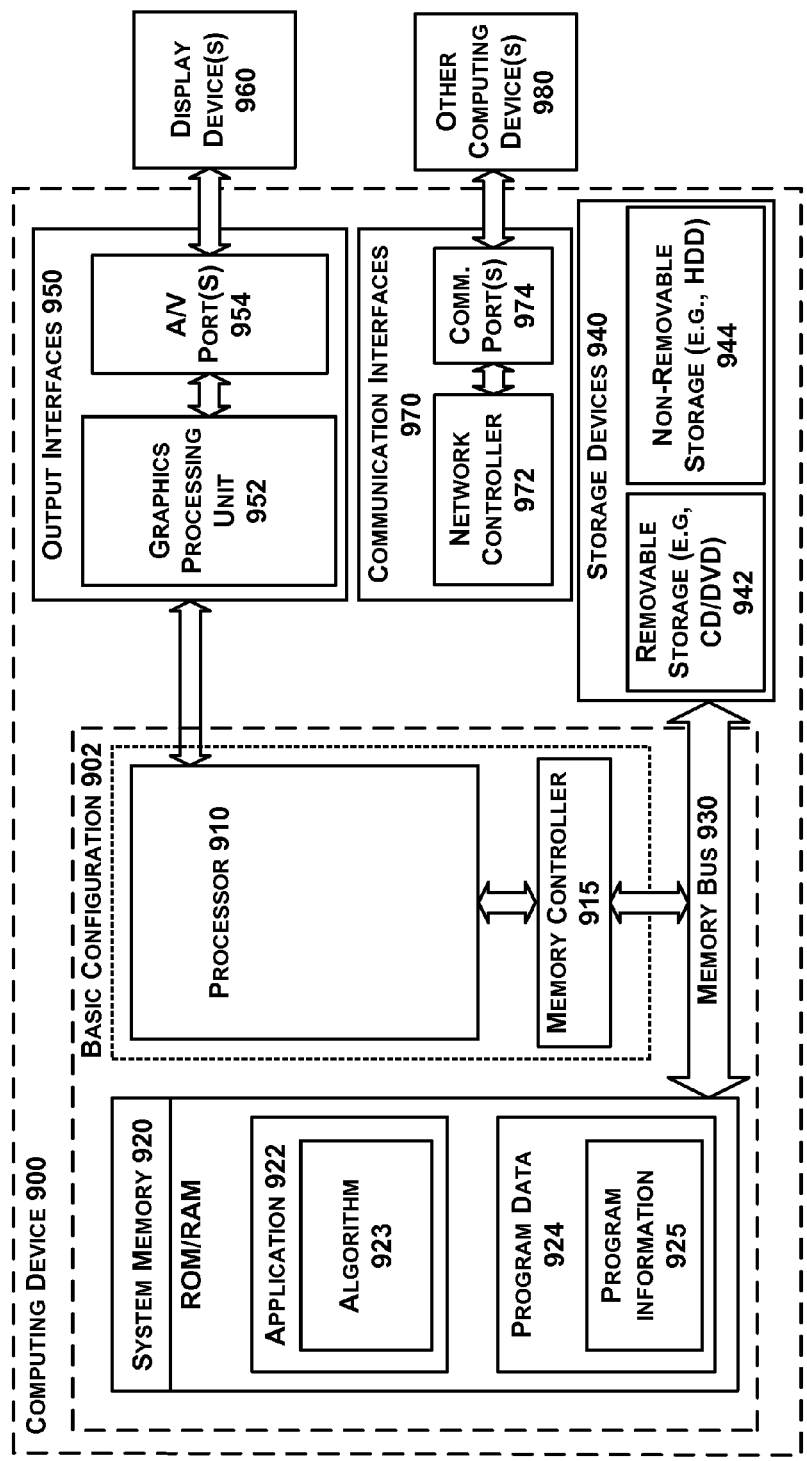
FIG. 9 is a functional block diagram illustrating an example computing device used in a computing system that is arranged in accordance with at least some embodiments described herein.

FIG. 9 is a functional block diagram illustrating an example computing device 900 used in a computing system that is arranged in accordance with at least some embodiments described herein. The computing device 900 may be implemented to determine whether an application of the computing device may use a wireless communication component to determine a location of the computing device or perform any of the functions described above with reference to FIGS. 1-8. In a basic configuration 902, computing device 900 may typically include one or more processors 910 and system memory 920. A memory bus 930 can be used for communicating between the processor 910 and the system memory 920. Depending on the desired configuration, processor 910 can be of any type including but not limited to a microprocessor (µP), a microcontroller (µC), a digital signal processor (DSP), or any combination thereof. A memory controller 915 can also be used with the processor 910, or in some implementations, the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 may include one or more applications 922, and program data 924. Application 922 may include an algorithm 923 that is arranged to access one or more configuration settings and select one or more location-determination components, in accordance with the present disclosure. Program data 924 may include program information 925 that could be directed to any number of types of data. For instance, application 922 may execute an algorithm that is configured to determine whether the mobile device may use a wireless communication component to determine a location of the mobile device. In some example embodiments, application 922 can be arranged to operate with program data 924 on an operating system.

Computing device 900 can have additional features or functionality, and additional interfaces to facilitate communications between the basic configuration 902 and any devices and interfaces. For example, data storage devices 940 can be provided including removable storage devices 942, non-removable storage devices 944, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable instructions, data structures, program modules, or other data.

System memory 920 and storage devices 940 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include output interfaces 950 that may include a graphics processing unit 952, which can be configured to communicate to various external devices such as display devices 960 or speakers via one or more A/V ports 954 or a communication interface 970. The communication interface 970 may include a network controller 972, which can be arranged to facilitate communications with one or more other computing devices 980 over a network communication via one or more communication ports 974. The communication connection is one example of a communication media. Communication media may be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer, including both laptop computer and non-laptop computer configurations, or a server.

In some embodiments, the disclosed methods may be implemented as computer program instructions encoded on a non-transitory computer-readable storage media in a machine-readable format, or on other non-transitory media or articles of manufacture. FIG. 10 is a schematic illustrating a conceptual partial view of an example computer program product 1000 that includes a computer program for executing a computer process on a computing device, arranged according to at least some embodiments presented herein.

In one embodiment, the example computer program product 1000 is provided using a signal bearing medium 1001. The signal bearing medium 1001 may include one or more programming instructions 1002 that, when executed by one or more processors may provide functionality or portions of the functionality described above with respect to FIGS. 1-9. In some examples, the signal bearing medium 1001 may encompass a computer-readable medium 1003, such as, but not limited to, a hard disk drive, a Compact Disc (CD), a Digital Video Disk (DVD), a digital tape, memory, etc. In some implementations, the signal bearing medium 1001 may encompass a computer recordable medium 1004, such as, but not limited to, memory, read/write (R/W) CDs, R/W DVDs, etc. In some implementations, the signal bearing medium 1001 may encompass a communications medium 1005, such as, but not limited to, a digital and/or an analog communication medium (e.g., a fiber optic cable, a waveguide, a wired communications link, a wireless communication link, etc.). Thus, for example, the signal bearing medium 1001 may be conveyed by a wireless form of the communications medium 1005 (e.g., a wireless communications medium conforming to the IEEE 802.11 standard or other transmission protocol).

The one or more programming instructions 1002 may be, for example, computer executable and/or logic implemented instructions. In some examples, a computing device such as the computing device 900 of FIG. 9 may be configured to provide various operations, functions, or actions in response to the programming instructions 1002 conveyed to the computing device 900 by one or more of the computer-readable medium 1003, the computer recordable medium 1004, and/or the communications medium 1005.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A mobile device, comprising:
    a processor; and
    a computer-readable medium, configured to store instructions, that when executed by the processor, cause the mobile device to perform functions comprising:
        providing an interface that enables selection of a first configuration setting and a second configuration setting of a Wi-Fi wireless communication component of the mobile device;
        receiving data indicating a selection to disable the first configuration setting of the Wi-Fi wireless communication component of the mobile device, wherein when the first configuration setting is disabled, the mobile device is prohibited from using the Wi-Fi wireless communication component to connect to one or more available wireless networks to facilitate wireless data communication;
        receiving data indicating a selection to enable the second configuration setting of the Wi-Fi wireless communication component, wherein when the second configuration setting is enabled, the mobile device is permitted to use the Wi-Fi wireless communication component to scan for available wireless access points within a wireless range of the mobile device to facilitate location determination even when the mobile device is prohibited from using the Wi-Fi wireless communication component to facilitate wireless data communication; and
        determining, based on receiving data indicating the selection to disable the first configuration setting and the selection to enable the second configuration setting, that an application of the mobile device is permitted to use the Wi-Fi wireless communication component to determine a location of the mobile device in response to a location request from the application.

2. The mobile device of claim 1, wherein when the second configuration setting is enabled the mobile device is permitted to use the Wi-Fi wireless communication component to scan for the available wireless access points to facilitate location determination when, based on the first configuration setting, the mobile device is prohibited from using the Wi-Fi wireless communication component to connect to the one or more available wireless networks to facilitate wireless data communication.

3. The mobile device of claim 1, wherein the functions further comprise configuring, based on the first configuration setting and the second configuration setting, how frequently the mobile device is permitted to use the Wi-Fi wireless communication component to scan for the available wireless access points.

4. The mobile device of claim 3, further comprising:
    receiving data indicating subsequent selections to enable the first configuration setting and disable the second configuration setting;
    determining, based on receiving data indicating the subsequent selections, that the first configuration setting is enabled and the second configuration setting is disabled; and
    responsive to determining that the first configuration setting is enabled and the second configuration setting is disabled, configuring the mobile device to only be permitted to use the Wi-Fi wireless communication component to scan for the available wireless access points in response to receiving a location request from the application in response to receiving data indicating a further selection to enable the second configuration setting.

5. The mobile device of claim 1, further comprising:
    determining that the application is prohibited from using the Wi-Fi wireless communication component to determine the location of the mobile device when the first configuration setting is disabled and the second configuration setting is disabled.

6. The mobile device of claim 1, wherein the functions further comprise:
    receiving, from the application, a request to determine the location of the mobile device;
    based on receiving the request, determining that the first configuration setting is disabled and the second configuration setting is disabled;
    responsive to determining that the first configuration setting is disabled and the second configuration setting is disabled and receiving the request to determine the location of the mobile device, providing for display a notification indicating that the first configuration setting should be enabled to improve location accuracy.

7. The mobile device of claim 1, further comprising:
    responsive to determining that the first configuration setting is disabled and the second configuration setting is enabled, providing for display a notification indicating that the mobile device is permitted to use the wireless communication component to scan for the available wireless access points to facilitate location determination.

8. A method, comprising:
receiving, by a mobile device, data indicating a request to determine a location of the mobile device;
responsive to receiving the data indicating the request, determining, by the mobile device, that a first configuration setting for a Wi-Fi wireless communication component is disabled, wherein when the first configuration setting for the Wi-Fi wireless communication component is disabled, the mobile device is prohibited from using the Wi-Fi wireless communication component to connect to one or more available wireless networks to facilitate wireless data communication;
determining whether a second configuration setting for a Wi-Fi wireless communication component of the mobile device is enabled, wherein when the second configuration setting is enabled the mobile device is permitted to use the Wi-Fi wireless communication component to scan for available wireless access points within a wireless range of the mobile device to facilitate location determination even when the mobile device is prohibited from using the Wi-Fi wireless communication component to facilitate wireless data communication;
based on determining that the second configuration setting is enabled, selecting, by the mobile device, at least the Wi-Fi wireless communication component from one or more of a plurality of location-determination components to use to determine the location of the mobile device, wherein the plurality of location-determination components comprises a global positioning system (GPS), the Wi-Fi wireless communication component, and a cellular radio communication component; and
determining, by the mobile device, the location of the mobile device using at least the Wi-Fi wireless communication component in response to a location request from an application.

9. The method of claim 8, wherein selecting the one or more location-determination components based on the determination regarding whether the second configuration setting is enabled comprises:
determining that the second configuration setting is enabled; and
selecting at least the Wi-Fi wireless communication component from the plurality of location-determination components.

10. The method of claim 8, wherein selecting the one or more location-determination components based on the determination regarding whether the second configuration setting is enabled comprises:
determining that the second configuration setting is disabled; and
selecting at least one of the GPS and the cellular radio communication component from the plurality of location-determination components.

11. The method of claim 8, further comprising responsive to determining that the first configuration setting is disabled, providing for display a notification indicating that the configuration setting should be enabled to improve location accuracy.

12. A non-transitory computer-readable medium having stored therein instructions, that when executed by a mobile device, cause the mobile device to perform functions comprising:
receiving data indicating a request to determine a location of the mobile device;
responsive to receiving the data indicating the request, determining that a first configuration setting for a Wi-Fi wireless communication component is disabled, wherein when the first configuration setting for the Wi-Fi wireless communication component is disabled, the mobile device is prohibited from using the Wi-Fi wireless communication component to connect to one or more available wireless networks to facilitate wireless data communication;
determining whether a second configuration setting for the Wi-Fi wireless communication component of the mobile device is enabled, wherein when the second configuration setting is enabled the mobile device is permitted to use the Wi-Fi wireless communication component to scan for available wireless access points within a wireless range of the mobile device to facilitate location determination even when the mobile device is prohibited from using the Wi-Fi wireless communication component to facilitate wireless data communication;
based on determining that the second configuration setting is enabled, selecting at least the Wi-Fi wireless communication component from one or more of a plurality of location-determination components to use to determine the location of the mobile device, wherein the plurality of location-determination components comprises a global positioning system (GPS), the Wi-Fi wireless communication component, and a cellular radio communication component; and
determining the location of the mobile device using at least the Wi-Fi wireless communication component in response to a location request from an application.

13. The non-transitory computer-readable medium of claim 12, wherein selecting the one or more location-determination components based on the determination regarding whether the second configuration setting is enabled comprises:
determining that the second configuration setting is enabled; and
selecting at least the Wi-Fi wireless communication component from the plurality of location-determination components.

14. The non-transitory computer-readable medium of claim 12, wherein selecting the one or more location-determination components based on the determination regarding whether the second configuration setting is enabled comprises:
determining that the second configuration setting is disabled; and
selecting at least one of the GPS and the cellular radio communication component from the plurality of location-determination components.

15. The non-transitory computer-readable medium of claim 12, wherein the functions further comprise responsive to determining that the second configuration setting is disabled, providing for display a notification suggesting that the second configuration setting should be enabled to improve location accuracy.

* * * * *